(12) United States Patent
Schwarzmann

(10) Patent No.: US 8,943,034 B2
(45) Date of Patent: Jan. 27, 2015

(54) DATA CHANGE MANAGEMENT THROUGH USE OF A CHANGE CONTROL MANAGER

(75) Inventor: Winfried Schwarzmann, Waghaeusel (DE)

(73) Assignee: SAP SE, Walldorf, DE (US)

(*) Notice: Subject to any disclaimer, the term of this patent is extended or adjusted under 35 U.S.C. 154(b) by 11 days.

(21) Appl. No.: 13/335,891

(22) Filed: Dec. 22, 2011

(65) Prior Publication Data
US 2013/0166506 A1    Jun. 27, 2013

(51) Int. Cl.
G06F 7/00       (2006.01)
G06F 17/30      (2006.01)

(52) U.S. Cl.
CPC .................. G06F 17/30575 (2013.01)
USPC ........... 707/705; 707/716; 707/758; 707/769; 709/208; 709/220; 709/223; 709/238

(58) Field of Classification Search
None
See application file for complete search history.

(56) References Cited

U.S. PATENT DOCUMENTS

| | | | | |
|---|---|---|---|---|
| 5,542,047 A * | 7/1996 | Armstrong | ..................... | 709/224 |
| 6,269,396 B1 * | 7/2001 | Shah et al. | ..................... | 709/223 |
| 2003/0196094 A1 * | 10/2003 | Hillis et al. | ..................... | 713/179 |
| 2008/0126354 A1 * | 5/2008 | Wang et al. | ..................... | 707/10 |
| 2009/0119346 A1 * | 5/2009 | Lu et al. | ..................... | 707/201 |
| 2010/0094862 A1 * | 4/2010 | Bent et al. | ..................... | 707/716 |
| 2010/0268825 A1 * | 10/2010 | Jeong et al. | ..................... | 709/226 |
| 2010/0293334 A1 * | 11/2010 | Xun et al. | ..................... | 711/129 |
| 2011/0153624 A1 | 6/2011 | Aigner et al. | | |
| 2011/0289199 A1 * | 11/2011 | Kuo et al. | ..................... | 709/221 |

* cited by examiner

Primary Examiner — Fred I Ehichioya
Assistant Examiner — Hasanul Mobin
(74) Attorney, Agent, or Firm — Brake Hughes Bellermann LLP

(57) ABSTRACT

The present description refers to a computer implemented method, computer program product, and computer system to store a node dependency network that includes a plurality of data nodes and one or more links between two or more data nodes, each link representing a data dependency between instances of the two or more data nodes, to forward a requested change to a first data node from a first change control component to a change control manager, identify, by the change control manager based upon the links within the node dependency network, one or more dependent data nodes that are dependent upon the first data node, and determine one or more dependent changes to be performed to one or more instances of the dependent data nodes to maintain consistency among instances of the data nodes.

19 Claims, 6 Drawing Sheets

DATA CHANGE MANAGEMENT THROUGH USE OF A CHANGE CONTROL MANAGER

TECHNICAL FIELD

This description is directed generally to data change management, and in particular, to the central control of data consistency after data changes.

BACKGROUND

As data systems become larger and more complex, it becomes more challenging to manage data. For example, making one change to data within a system may require one or more additional changes to other data within the system to maintain consistency within the system due to the relationships or dependencies between different data.

SUMMARY

In one general aspect, a computer program product is provided. The computer program product is tangibly embodied on a computer-readable storage medium and includes executable code that, when executed, is configured to cause at least one data processing apparatus to store a node dependency network that includes a plurality of data nodes and one or more links between two or more data nodes, each link representing a data dependency between instances of the two or more data nodes. The executable code is further configured to cause the at least one data processing apparatus to associate each data node to one of a plurality of change control components, store a set of data node instances, each data node instance comprising an instance of a corresponding data node of the node dependency network, each data node instance having a structure identified by the corresponding data node, receive, by a first change control component, a request to change a first instance of a first data node, wherein the first data node is associated with the first change control component, and forward the requested change from the first change control component to a change control manager. The executable code is further configured to cause the at least one data processing apparatus to identify, by the change control manager based upon the links within the node dependency network, one or more dependent data nodes that are dependent upon the first data node, determine one or more dependent changes to be performed to one or more instances of the dependent data nodes to maintain consistency among instances of the data nodes, and apply the requested change to the first instance of the first data node and the one or more dependent changes to the one or more instances of the dependent data nodes.

In another general aspect, a computer implemented method is provided that includes storing a node dependency network that includes a plurality of data nodes, the node dependency network also including one or more links between two or more data nodes, each link representing a data dependency between instances of the two or more data nodes. The method also includes associating each data node to one of a plurality of change control components, storing a set of data node instances, each data node instance comprising an instance of a corresponding data node, each node instance having a structure identified by the corresponding data node, receiving, by a first change control component, a request to change a first instance of a first data node, wherein the first data node is associated with the first change control component, forwarding the requested change from the first change control component to a change control manager, identifying, by the change control manager based upon the links within the node dependency network, one or more dependent data nodes that are dependent upon the first data node, determining one or more dependent changes to be performed to one or more instances of the dependent data nodes to maintain consistency among instances of the data nodes, and applying the requested change to the first instance of the first data node and the one or more dependent changes to the one or more instances of the dependent data nodes.

In another general aspect, an apparatus includes storing logic configured to store a node dependency network that includes a plurality of data nodes and one or more links between two or more data nodes, each link representing a data dependency between instances of the two or more data nodes, association logic configured to associate each data node to one of a plurality of change control components, and storing logic configured to store a set of data node instances, each data node instance comprising an instance of a corresponding data node of the node dependency network, each data node instance having a structure identified by the associated data node. The apparatus also includes receiving logic configured to receive, by a first change control component, a request to change a first instance of a first data node, wherein the first data node is associated with the first change control component, forwarding logic configured to forward the requested change from the first change control component to a change control manager, identification logic configured to identify, by the change control manager based upon the links within the node dependency network, one or more dependent data nodes that are dependent upon the first data node, dependent change determination logic configured to determine one or more dependent changes to be performed to one or more instances of the dependent data nodes to maintain consistency among instances of the data nodes, and change applying logic configured to apply the requested change to the first instance of the first data node and the one or more dependent changes to the one or more instances of the dependent data nodes.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1A:
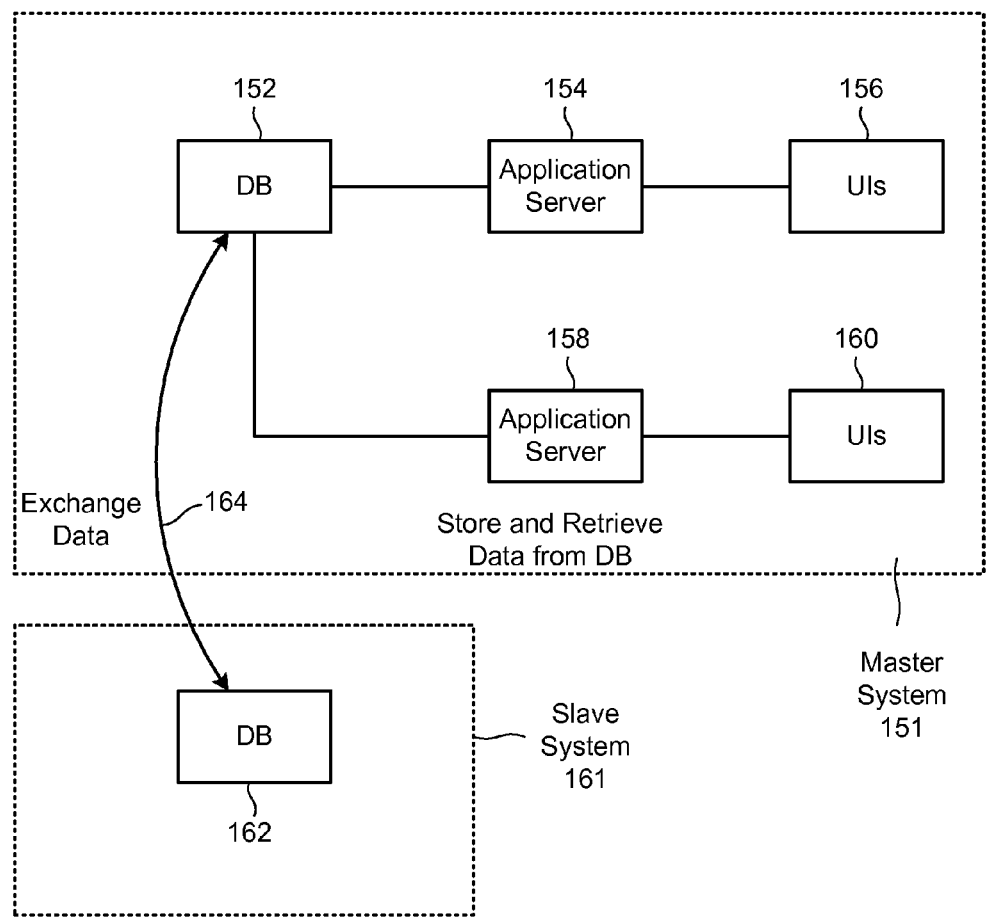
FIG. 1A is a block diagram illustrating an exemplary data system in which data may be exchanged between multiple databases.

FIG. 1A is a block diagram illustrating an exemplary data system in which data may be exchanged between multiple databases. Data may be stored in database 152. Application servers 154 and 158 may store data in database 152 and may retrieve data from database 152. A user interface (UI) 156 may be used to receive data and to input data via application server 154 while user interface (UI) 160 may be used to send (input) and receive data via application server 158. Data may be exchanged between database 152 and a second database 162 via line 164.

For example, there may be different types of data that need to be managed within a system or among different systems. As one example, transactional data may include data that describes one or more transactions, such as a sale or purchase of one or more items or products, for example. Transactional data may describe the various details of each transaction such as the date and time of the transaction, identification of the product that is sold, price and quantity information, identification of the customer that purchased the product, etc. It is desirable for all systems or computers within a company to have (or have access to) the same transactional data.

As another type of data, configuration data may include data that may describe options how to define master or transactional data. As a first example, configuring material groups allows organizing material master data. As a second example, configuring organizational data allows to associate a sales transaction appropriately. According to one example implementation, a software system may be hosted for several customers or clients, and the configuration data for each client may be client-dependent, for example. According to another example implementation, a system may also allow defining configuration data valid for all clients, for example. Different systems or computers within a company or organization should have the same configuration data.

Finally master data may include information that is key to the operation of a business or organization. While transactional data may change over time as new transactions are recorded, master data may be considered to be permanent or more persistent for a company or organization, and may include data about customers, products, employees, materials, suppliers, etc. Thus, master data, according to one example implementation, may be considered persistent, non-transactional data that defines a business entity for which there is, or should be, an agreed upon view across the organization. Thus, different systems or computers within a company or organization should all have the same master data.

Figure 1B:
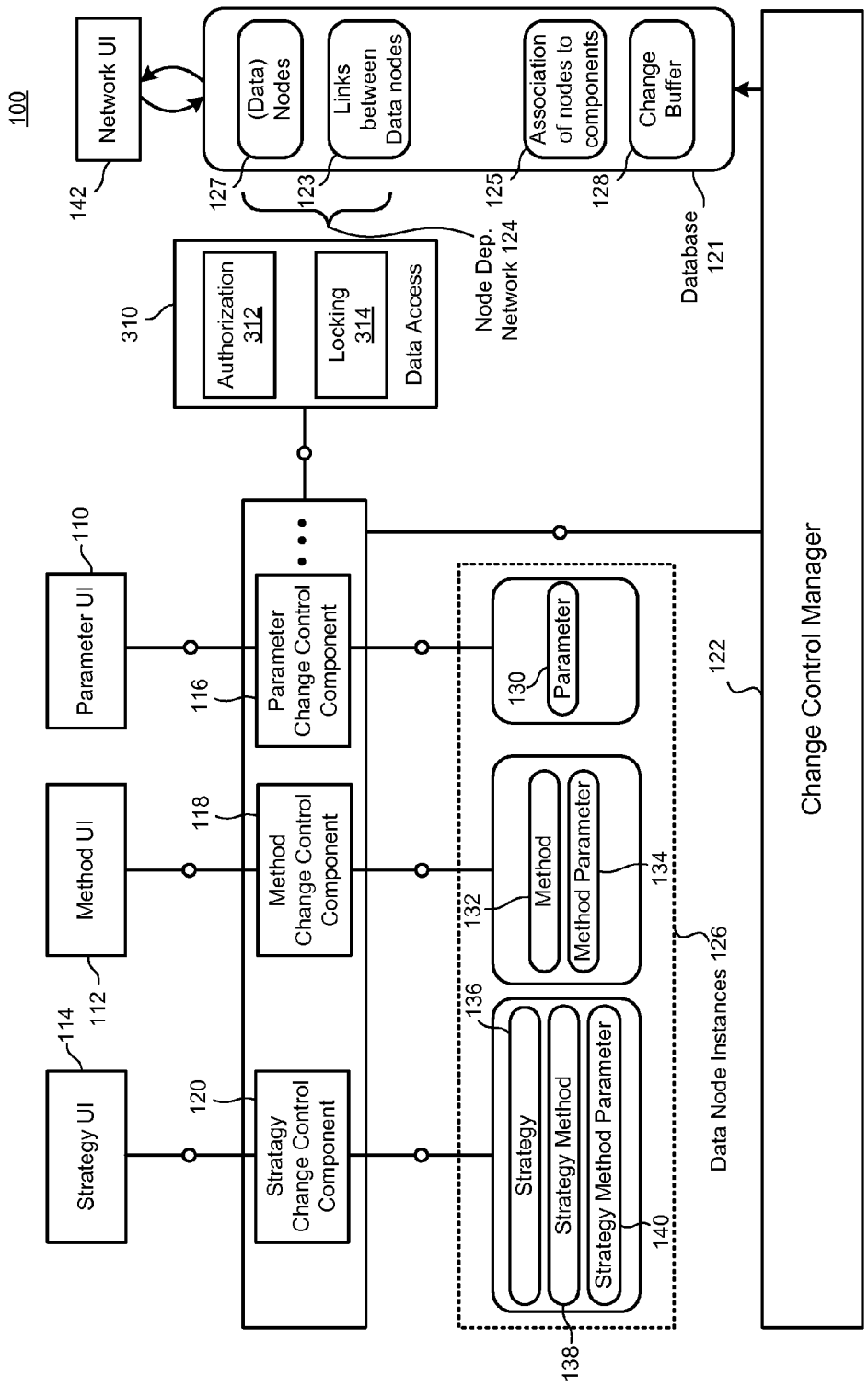
FIG. 1B is a block diagram illustrating an exemplary change control system 100 in which changes to data are managed through the use of a change control manager 122.

FIG. 1B is a block diagram illustrating an exemplary change control system 100 in which changes to data are managed through the use of a change control manager 122. According to one example implementation that is used for illustrative purposes, parameters, methods, and strategies of business processes may be subsequently particularized by hierarchically organized customizing data. A parameter is an individual variable which type describes its value range. A method may include a series of operations, and may include one or more parameters to steer these operations. A strategy may include a sequence of methods and concrete values for the parameters associated with each method. This is merely one example of an arrangement and use of data with inherent dependencies, and others may be provided.

A parameter user interface (UI) 110 may allow a user to input or set parameters or to make changes to parameters (or parameter node instances). A method UI 112 may allow a user to initialize or set up methods or make changes to methods (or method node instances). Additionally, it may allow a user to assign a parameter to a method or make changes to those assignments. A strategy UI 114 may allow a user to establish strategies (or instances of strategy nodes) or make changes to strategies. Additionally, it may allow a user to assign a method to a strategy, assign a strategy-specific value to a method parameter, or make changes to those assignments.

A node dependency network 124 includes a plurality of data nodes 127 and links 123 between data nodes. Data node instances, which may be specific instances of data nodes, may be stored in data node instances 126. Each data node may be associated with one of the change control components 116, 118 or 120. Block 125 may define the change control components and store the associations of data nodes to change control components.

For example, a parameter (data) node instance 130 may be associated with parameter change control component 116, a method node instance 132 and a method parameter node instance 134 may be associated with method change control component 118, and a strategy node instance 136, a strategy method node instance 138, and a strategy method parameter node instance 140 may be associated with strategy change control component 120.

Node dependency network 124 also includes links 123 to identify dependencies between two or more data nodes. In an example implementation, dependencies may be identified by links, which may include directional links, from one node to another node. A dependency between data nodes may exist when, for example, a change to a first data node instance would impact or affect a second data node instance.

Data node instances 126 store various data node instances, such as instances for: parameter nodes 130, method nodes 132, method parameter nodes 134, strategy nodes 136, strategy method nodes 138, and strategy method nodes 140. In one example implementation, data node instances 126 may be stored in various tables within database 121.

One or more change control components are also shown in FIG. 1B, including a parameter change control component 116 to control changes made to instances of one or more parameter nodes 130, a method change control component 118 to control changes made to instances of one or more method node 132 or method parameter nodes 134, and a strategy control component 120 to control changes made to instances of one or more strategy nodes 136, strategy method nodes 138 or strategy method parameter nodes 140. As noted, change control manager 122 manages or coordinates changes received via the different user interfaces such as via parameter UI 110, method UI 112 and strategy UI 114, and/or manages changes among dependent data node instances in order to maintain consistency among the data node instances. In another embodiment, an initial change request may be alternatively be triggered by one or more applications (in connection to at least one of the change control components), or any combinations thereof.

As shown in FIG. 1B, a data access block 310 may include an authorization block 312 and a locking block 314. Authorization block 312 may confirm that a user or application has authorization to make a change to data, and locking block 314 may retrieve or obtain the lock for accessing this part of the persistency (e.g., a database table), before allowing a change to data, as described in greater detail below with reference to FIG. 3.

In an example embodiment, node dependency network 124 (including data nodes 127 and links 123) and associations of data nodes to change control components 125 may be stored, for example, in a database 121, or in multiple databases. Node dependency network 124 identifies a structure of one or more data nodes (127) and dependencies (identified by links 123) between data nodes. A data node 127 defines the data structure for a plurality of data node instances 126. In an example embodiment, such a data structure is an arrangement of data fields, defining with a type for each field the possible values which instances of this data node may have for this field.

A network UI 142 may allow a user to make changes to the configuration of the configuration change management, such as changes to node dependency network 124 and/or association of nodes to change control components 125.

Figure 2:
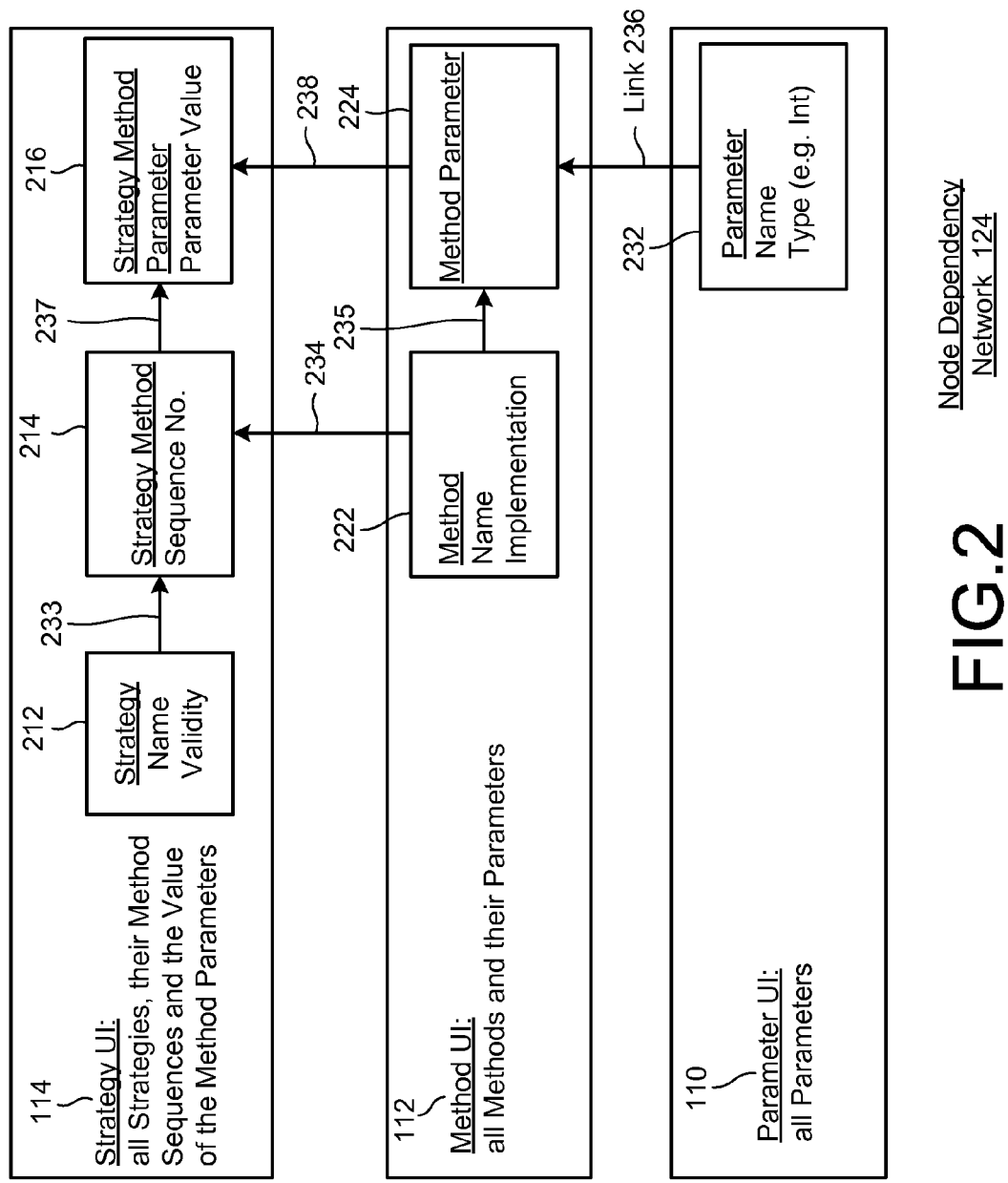
FIG. 2 is a block diagram illustrating an exemplary node dependency network 124.

FIG. 2 is a block diagram illustrating an exemplary node dependency network 124. Node dependency network 124 identifies a basic structure for strategies, methods and parameters, including fields thereof, and how generally parameters and methods may relate to strategies. Also, the different user interfaces (UIs) are shown in FIG. 2 as being used to make changes or edits to specific node instances. For example, strategy UI 114 may be used to input or make edits to instances of strategy node 212, strategy method node 214 and strategy method parameter node 216. Method UI 112 may be used to make changes or edits to instances of method node 222 and method parameter node 224. Parameter UI 110 may be used to input edits or changes to instances of parameter node 232. When a change is requested via a UI for an instance of a data node, the change control component (116, 118 or 120, FIG. 1B) associated with the data node may receive the requested data change, and may control the change to the data node instance.

As shown in the node dependency network 124 of FIG. 2, parameter node 232 may comprise a structure that includes a field for the name of the parameter and one or more fields for the type of the parameter such as integer, alphanumeric, date, etc. Method node 222 may include a field for the name of the method and fields with references to its actual implementation (for example, name of a class and name of a method of this class). Method parameter node 224 may include, next to the names of the method and the parameter, also a default value for this parameter when used for this method.

Strategy node 212 may comprise a structure that includes a field for the name (unique identifier) of the strategy, and possibly fields for its validity. Since a strategy may include a plurality of methods provided in a particular sequence or order, strategy method node 214 may include, next to the names of the strategy and the method, a field for the sequence number of the method within the strategy. Strategy method parameter node 216 may include, next to the names of the strategy, the method, and the parameter, a field that identifies the value of this method parameter for this strategy method. Thus, to a method instance there is zero, one or a plurality of parameter instances assigned, and to a strategy instance there is a sequence of strategy method instances plus a plurality of strategy method parameter instances assigned. In order to define a strategy consistently, any parameter assigned to any method of the strategy may typically receive a value, except if a default value can already be provided with the method parameter instance.

Node dependency network 124 may also identify dependencies between instances of data nodes, based on links provided between nodes of node dependency network 124. A data dependency between data nodes may exist when, for example, a change to a first data node would impact or affect a second data node. More precisely, this data dependency exists if a change to at least one instance of this first data node would impact or affect at least one instance of this second data node. A data dependency between two data node instances may be represented within node dependency network 124 as a link from a first data node to a second data node. In an example implementation, the links 123 between data nodes of node dependency network 124 indicate such data dependencies between instances of the identified nodes.

The example node dependency network 124, illustrated in FIG. 2, includes a plurality of links between data nodes. In FIG. 2, the links 235 and 236 indicate that the method parameter node 224 is depending on both the parameter node 232 and the method node 222, respectively. In other words, an assignment of a parameter instance to a method instance is requiring the existence of either one of them. Therefore, if the deletion of either the parameter instance or the method instance is requested, then the deletion of the method parameter instance is a dependent change that should also be performed in order to maintain consistency among these instances. Similarly, the links 233 and 234 indicate the dependency of the strategy method node 214 on both the strategy node 212 and the method node 222, and the links 237 and 238 indicate the dependency of the strategy method parameter node 216 of both the strategy method node 214 and the method parameter node 224. In detail, the links 237 and 238 indicate that for the consistency of a strategy method parameter instance not only the referenced instances of strategy, method, and parameter, but also the corresponding assignment instances have to be defined. The node dependency network 124 identifies a plurality of data nodes and may identify dependencies between two or more of the data nodes. Each data node identifies a structure of one or more fields of specific data types. The data type of a field defines the values which a data node instance could provide for this field. A dependency between two data nodes may include, for example, a foreign-key relationship from a name field in the structure of data node method 222 defining a method to a name field in the structure of data node strategy method 214 using this method field.

In one embodiment, the (data) nodes and links of dependency network 124 are defined by a developer using network UI 142 before the employing software product is shipped. This definition strongly correlates with the design of the application UIs (here strategy, method, and parameter UI), mainly with respect to their change scope. A user of this application may overrule or extend this node dependency network after installation and before productive use. For example, the user has modified a shipped UI accordingly. Or the user has designed new customer-specific data, including UI and persistency as well as a change control component in between. In any case, the association of data nodes to components has to be defined accordingly. In another embodiment, the dependency links may be determined automatically. This may require that all dependencies are related to foreign-key-relationships, and that the data node definition includes this persistency-based information.

One or more instances of each data node may be created (and/or edited) and stored in the same database table, such as a database table as part of data node instances 126, shown in FIG. 1B. Instances of data nodes may be stored in one database or in multiple databases, and may be stored in one or more data storage devices. In one example implementation, the change control component of the data node provides access to this database table. This access is, for example, used by a UI through which a user creates, changes, or deletes instances of this data node. A UI may allow the maintenance of multiple data nodes with multiple views. If the UI is connected to a single change control component, and this is in general the case, then all data nodes of the UI are associated with this change control component. Data node instances may be, for example, input from a user via a UI or from an application. Assume, for example, the creation of a parameter instance is requested via parameter UI 110. This request is then received by parameter change control component 116, and forwarded to change control manager 122. Since the (data) node 224 is directly depending on the parameter node 232 (see FIG. 2), manager 122 notifies at least change control components 118 of this request. In one example embodiment, change control manager 122 may also notify change control component 120 due to the indirect dependency of node 216 on node 232, but, in general, it will only do so after a dependent change on node 224 has occurred. But in case the new parameter instance was not used by a method or a strategy instance yet, the (possible) dependency on node level makes no dependent changes on instance level necessary.

As another example for FIG. 2, the deletion of a method instance, that is, an instance of method node 222 is requested by an application. This request is then received by method change control component 118, and forwarded to change control manager 122. As shown in FIG. 2, nodes 224 and 214 of dependency network 124 are depending on method node 222, based on links 235 and 234, respectively. For this reason, both the method change control component 118 and strategy change control component 120 are notified by the change control manager 122 (FIG. 1B) of the requested deletion of this method instance. Method change control component 118 identifies all method parameter instances which were depending on it, e.g., based on links provided within node dependency network 124. In other words, it marks all assignments of parameter instances to the deleted method instance for deletion. Likewise, strategy component 210 identifies all strategy method instances which were depending on it. In other words, it marks all appearances of this method instance in method sequences of strategy instances for deletion. Afterwards, upon notification by change control components 118 and 120 about the marked deletions, manager 122 identifies based on the node dependency network 124 that node 216 is depending on node 224, and notifies its associated change control component 120 accordingly in order to identify all strategy method parameter instances, which are either depending on marked instances of node 224 or marked instances of node 214. Since, according to this illustrative example, the node dependency network 124 does not include any further dependencies, the change control manager 122 returns all dependent changes back to method change control component 120 for presenting them to the user or the calling application. In case of acceptance of the changes by the user or application, all marked deletions are performed. In case of rejection, all deletion marks are removed.

A state change of an instance may occur, for example, if this instance is created or deleted. In most cases this immediately requires dependent changes in order to maintain (syntactical) consistency among the instances. A value change of an instance may occur, for example, if the value of a non-key field of this instance is changed. In most cases this does not require any dependent changes, but in some this may even require that other instances have to be deleted in order to maintain (semantic) consistency among the instances.

Change control manager 122 may store the (state or value) changes to a change buffer 128 (FIG. 1B) if it cannot or does not want to perform them immediately after acceptance of the changes by the user or the application. For example, this may be the case if the changed instances represent inactive versions, and activating them is a separate task which is performed by a decoupled activation engine. In another embodiment, this intermediate storage is necessary because the changed data nodes represent client-independent data, and the change control process needs to be completed by client-dependent jobs. These jobs may be scheduled by change control manager 122 before its termination, and each job reads the changes at its beginning in order to react on them in its client.

Figure 3:
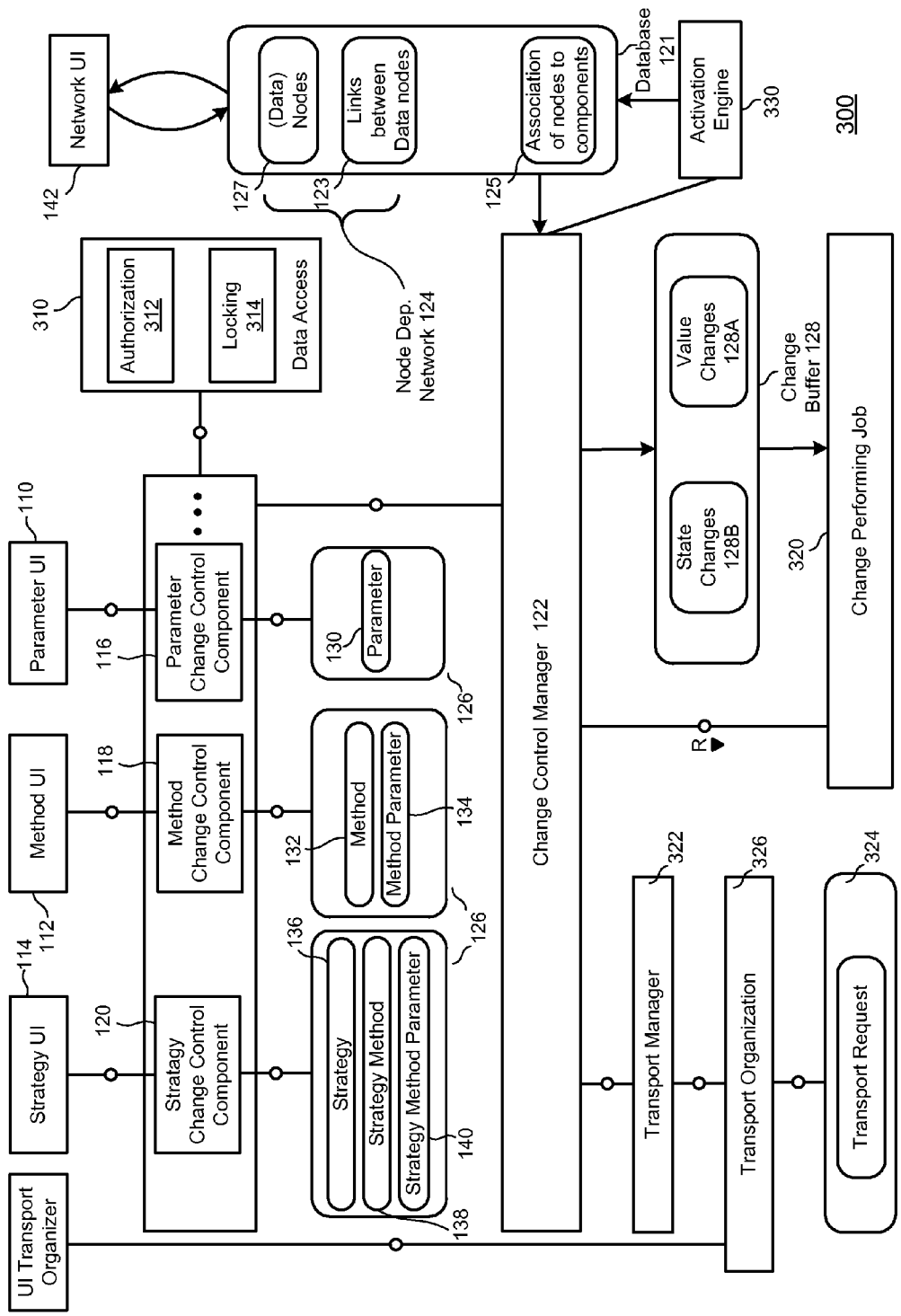
FIG. 3 is a block diagram illustrating another exemplary system in which changes to data are managed through the use of a change control manager 122.

FIG. 3 is a block diagram illustrating another exemplary system in which changes to data are managed through the use of a change control manager 122. The system 300 of FIG. 3 includes a number of components or blocks shown in FIG. 1B plus some additional components or blocks. System 300 may include a strategy UI 114, a method UI 112, and a parameter UI 110. Strategy change control component 120 may receive changes to instances of strategy-specific data nodes 212, 214, and 216 via strategy UI 114. Method change control component 118 may receive edits or changes to instances of method-specific data nodes 222 and 224 via method UI 112. And, parameter change control component 116 may receive changes to one or more instances of the parameter-specific data node 232 via parameter UI 110. These responsibilities of change control components for one or multiple data nodes may be defined through network UI 142, stored in storage 125 (definition of change control components and association of data nodes to change control components), and persisted within database 121. The change control manager 122 may access these associations 125 in order to notify the right change control components of changes on which instances of their data nodes may depend.

In one example implementation, the change control component associated with a data node may receive requested changes to instances of such data node from a user via UI 110, 112 or 114, or directly from an application, and may communicate such requested changes via change control manager 122 to other change control components (e.g., 116, 118, and/or 120). For example, a user may create instances of data nodes and may submit changes or requests to change instances of data nodes, e.g., via user interfaces 110, 112 and/or 114. Alternatively, the new data node instances could be requested by an application program from one or multiple of the change control components 116, 118, 120.

According to an example implementation, after a change control component 116, 118 or 120 receives a request (e.g., from a user or application) to change an instance of a data node, the change control component may confirm that the user or application requesting the change has authorization to make such change, and may retrieve a lock to write to the database table in which the instance is stored. Thus, for example, the change control component 116, 118 or 120 may send a change authorization request to data access block 310, the request identifying the application or user requesting the change and the data node or data node instance to be changed. The data access block 310 may retrieve persistency information about the data node instance from the node dependency network 124, more specifically from data nodes 127. Authorization block 312 may then confirm that the user or application has authorization to make such change to the data, and locking block 314 may retrieve or obtain the lock for accessing this part of the persistency (e.g., a database table). A lock for each portion of data, e.g., for each data node, or group of data nodes, may be kept by, for example, application server 154 (FIG. 1A) and stored in database 152 and/or 121 (FIG. 3), and only one change control component may obtain or retrieve a lock at a time. This way multiple simultaneous changes to the same data node instance can be avoided. Thus, according to an example implementation, an owner of a lock may be recorded in database 121 and/or 152, so that only one user or one application may make changes to any block of data at a time. Thus, for example, if a first user retrieves a lock for a block of multiple data node instances in order to make changes to just one instance, then a second user attempting to obtain the lock for the same block at the same time for changing another data node instance would be denied the lock, thus preventing two users from making changes to the block of data at the same time, which might create data errors or data inconsistencies. In principle, apart from the locking mechanism in place, the invention may support the change control management in parallel threads.

If a user or application does not have authorization to make the requested changes to the data node instances or block of data, or if the lock for the block of data or data node instances to be changed is unavailable, e.g., as being currently assigned to another user or application, then the control component 116, 118 or 120 receiving the request to change the data will send a change rejection message to the requesting user (e.g., via the UI 110, 112 and/or 114) or application that was used to submit the request to change the data node instance. The change rejection message provides an indication to the user or application that the change request has been denied or rejected.

In another example embodiment, at least one data node may contain client-independent data (e.g., customizing data) which may be used to define client-dependent data (e.g., customizing, master or transactional data). Client-independent data may be maintained in a specific client (e.g., customizing client), and in order to change it the change control manager has to run in this client. Since dependent changes must be performed in other clients, the change control manager 122 may store the state or value changes in client-independent storages (change buffers 128, including state changes 128B and value changes 128A) and schedule jobs for all relevant clients. Change control manager 122 may schedule jobs to be performed by change performing job 320. Each job, via change performing job 320, reads the state changes stored in 128B (about the existence of instances, e.g., from created to deleted) and value changes stored in 128A (about the content of fields, e.g., from one date to another) and requests them from the corresponding change control components. This is an asynchronous process, but dependent changes in different clients are independent of each other. In most cases, only the client-independent changes will be presented to the user or application for acceptance or rejection, the client-dependent ones are typically accepted, according to an example embodiment. But in some cases, the scheduled jobs (e.g., via change performing job 320) will determine all dependent changes and store them (e.g., within a change buffer 128, or other storage) as further state and value changes. After all jobs have finished, the client-independent change control manager will present all these changes to its user or calling application for final acceptance or rejection. In case of acceptance, another series of jobs is scheduled to actually perform the changes. In case of rejection, no special action may be necessary. In either case, the collected change records should be removed afterwards.

In the same or a different embodiment, the change request in a master system 151 (FIG. 1A) may include performing dependent changes to one or multiple slave systems 161 (FIG. 1A). For this, the change control manager may have access to the transport manager 322, which is in charge that not only the requested and the dependent changes are saved in one or multiple transport requests 324 (with the help of a state-of-the-art transport organization 326), but also the information about their internal dependency according to node dependency network 124. The latter information may be stored in a special transport request 324, or exchanged via line 164 using any other transportation mechanism (e.g., service message). Again, this is an asynchronous process, and it may be implemented with or without an acceptance loop as described above. A transport organizer UI 328 may provide a user interface to configure transport manager 322, transport organization 326, and/or receive or create transport requests 324, for example.

As noted above, changes to data node instances may be stored in a change buffer 128, including state changes 128B and value changes 128A. These changes to instances of nodes stored in change buffer 128 may include, for example, both changes to a first node instance(s), and any dependent changes to one or more additional node instances. In one example implementation, these changes to node instances may be stored as part of an inactive version of the node instances. An activation engine 330 may apply the changes to the node instances by, for example, overwriting (or replacing) an active version of the data node instances stored in data node instances 126 with the inactive version of the node instances (that includes the changes to the node instances) which may be stored in change buffer 128.

In addition, a data node may represent one of client-independent customizing, client-dependent customizing, master data, or transactional data. Alternatively, a data node instance may be an entry in a database table storing one of client-independent customizing (where a set of data or changes to data may be provided for multiple clients), client-dependent customizing (e.g., where a set of data or changes to data may be separately provided by or for each of multiple clients), master data (e.g., information that is key to an organization or client and is relatively permanent or persistent), or transactional data (data which describes various details of transactions). Customizing data, or configuration data, may include data that describes how a particular system is configured.

In addition, referring to FIG. 1A, a master system 151 may include a first data management process (e.g., running server(s) 154 and/or 158) and a first set of data node instances (e.g., stored in database 152). A slave system 161, which may include a server (or other computer or computing device) and a database 162, for example, may include a second data management process running on a server and a second set of data node instances. Applying a set of changes to node instances (including requested changes and dependent changes, for example) may include applying the requested changes and one or more dependent changes to both the first set of data node instances on the master system 151 and the second set of data node instances on the slave system 161.

In addition, a first client and a second client may each include or may each be provided with a node dependency network. A request to change a first instance of a data node may include receiving client-independent changes to a data node instance(s). Also, a job may be scheduled in the second client for determining and applying all dependent changes which are specific to the second client, for example.

Figure 4:
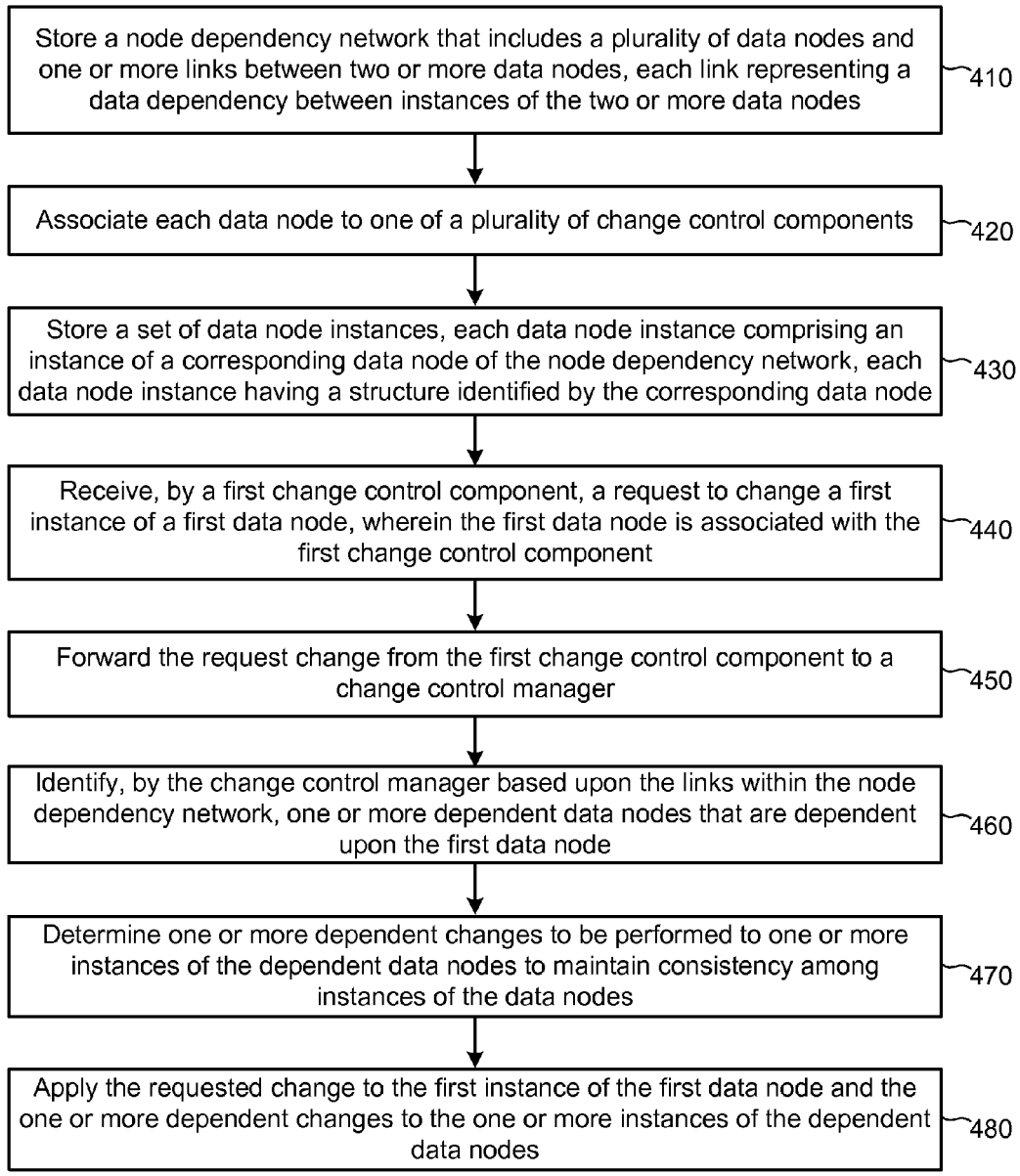
FIG. 4 is a flow chart illustrating an exemplary operation of a system performing data change management using a change control manager.

FIG. 4 is a flow chart illustrating an exemplary operation of a system performing data change management using a change control manager. At 410, a node dependency network (e.g., 124) is stored that includes a plurality of data nodes, the node dependency network also including one or more links between two or more data nodes, each link representing a data dependency between instances of the two or more data nodes. For example, a user may use network UI 142 to input at least the data nodes and their associations to the change control components. Further, either the user inputs or a processor determines (or receives) the links between these data nodes and stores them with node dependency network 124. Or, a node dependency network (including data nodes 127 and links 123) may be received via data exchange line 164 from another system and stored in the considered system as node dependency network 124.

At 420, each data node is associated with one of a plurality of change control components. For example, a user or application may input and/or a processor may store, e.g., within node/control component assignment 125, an association between each data node in node dependency network 124 and one of the change control components 116, 118 or 120.

At 430, a set of data node instances is stored, each data node instance comprising an instance of a corresponding data node of the node dependency network, each data node instance having a structure identified by the corresponding data node of the node dependency network. For example, a processor may receive (e.g., from a user via UI 110, 112 and/or 114, or from an application) and store within data node instances 126 one or more data node instances for one or more data nodes (e.g., the instances are persisted in one or more of the storages 130, 132, 134, 136, 138 and/or 140). Each data node may typically identify the structure, e.g., including one or more fields and/or other structure, of all its instances.

At 440, a request to change a first instance of a first data node is received by a first change control component, wherein the first data node is associated with the first change control component. For example, one of change control components 116, 118 or 120 may receive via UI 110, 112 or 114 a request from a user to change one or more data node instances that are stored in node instances 126. In asynchronous embodiments, these requested changes to the node instance(s) may also be stored within block 128, including any state changes 128B or value changes 128A for a data node instance. As an example, strategy change control component 120 may receive a request to change a "include amortization of tool kit" parameter of an "internal price calculation" method of a "product A pricing" strategy, where the "include . . . " parameter is an instance of the strategy method parameter data node 216. The "include . . . " parameter may, for example, influence the (external) price of a specific product, and may be used in several different strategy instances (e.g., to determine the external price of related products).

According to an example implementation, operation 440 may include receiving, by a first change control component from a user or application, a request to change a first instance of a first data node. The method may further include presenting the determined dependent changes to the user or application (e.g., for approval or rejection), and receiving an acceptance or rejection of the dependent changes from the user or application, wherein the applying the requested change to the first instance of the first data node and the one or more dependent changes to the one or more instances of the dependent data nodes is performed only in response to receiving an acceptance from the user or application. Otherwise, the requested change to the first instance of the first data node and the one or more dependent changes to the one or more instances of the dependent data nodes are canceled in response to receiving a rejection from the user or application.

In another example implementation, operation 440 may include receiving, by a first change control component from a user or application, a request to change a first instance of a first data node. The first change control component may, for example, perform the following before forwarding the requested change to the change control manager: confirming that the user or application has authorization to make the requested change to the first instance of the first data node; and retrieving one or more locks on the first data node for saving the changes to the first instance of the first data node.

At 450, the requested change is forwarded or sent from the first change control component to a change control manager. For example, at 440, a request to change the value of the "include amortization of tool kit" parameter is received by strategy change control component 120. At 450, (e.g., after obtaining the data lock and change authorization) the strategy change control component 120 may forward or may send the request to change the value of the "include . . . " parameter, which is an instance of a strategy method parameter data node 216 (FIG. 2), to change control manager 122.

At 460, one or more dependent data nodes that are dependent upon the first data node are identified by the change control manager 122 based upon the links, e.g., 236, within the node dependency network 124. As noted above, data dependencies between instances of data nodes may be indicated by links between data nodes within node dependency network 124. For example, change control manager 122 may search node dependency network 124 for any links directed from the data node for which the request to change the instance of the data node has been received.

For example, at 440, a request to change the state of the "include amortization of tool kit" parameter may have been received, where the "include . . . " parameter is an instance of the parameter node 232 (FIG. 2). The state change may be that this "include . . . " parameter is deleted, and this way changes its state from 'created' (existing) to 'deleted' (no longer existing). At 450, this request is forwarded to change control manager 122. In this example, at 460, change control manager 122 may search node dependency network 124 to identify any links connected to parameter node 232, such as link 236, for example. Link 236 is directed from parameter node 232 to method parameter node 224, indicating the dependency of instances of method parameter node 224 on instances of parameter node 232. Link 236 indicates the possibility that there may be instances of method parameter node 224 stored in data node instances 126 which refer to this parameter instance. Such a method parameter instance does not have to exist, e.g., because this parameter instance possibly has not been assigned to any method instance so far. But if a method parameter instance refers to the parameter instance, then this foreign-key-relationship is depending on the existence of the parameter instance, and consequently the consistency among the instances would break with the deletion (state change) of the parameter instance. The link 236 (FIG. 2) of node dependency network 124 indicates that instances of data node 224 depend upon one or more instances of parameter node 232, for example. As a result, a change to the "include . . . " parameter, which is an instance of parameter node 232, may impact instances of data node 224. Therefore, at 460, the change control manager 122 may search the links of node dependency network 124 to identify link 236 which indicates that method parameter node 224 is dependent upon parameter node 232, where a change request has been received to make a change to an instance of parameter node 232.

At 470, one or more dependent changes to be performed to one or more instances of the dependent data nodes are determined to maintain consistency among instances of the data nodes. Operation 470 may be performed by one or more change control components, in response to communication from change control manager 122.

At 470, once dependent node instances have been identified, which depend on the node instance for which the change request has been received, the respective change control components may identify one or more dependent changes to be performed to their dependent node instances to maintain consistency among the instances of the data nodes, according to a first implementation. For example, if a request has been received to delete a parameter node instance, then a dependent change may be identified to delete the dependent method parameter instances, too (meaning, in the same logical unit of work).

At 470, in the first example implementation, the change control manager 122 may let one or multiple change control components search data node instances 126 to identify one or more instances of the dependent data node(s) that depend on the instance of the data node for which a change request has been received. In the example described above, a deletion request was received for an instance of parameter node 232. Change control manager 122 identifies dependent method parameter node 224 and its associated change control component 118, the latter one based on association of (data) nodes to (change control) components 125. Then manager 122 asks component 118 to search for instances of data node 224 which are depending on the to be deleted parameter instance. Change control component 118 may then determine one or more changes to be performed to the instances of the dependent data node 224, which may be referred to as dependent changes, e.g., so as to maintain consistency between the changed instance of node 232 and the dependent data node 224.

For example, operation 470 may include that the change control manager 122 notifies one or more change control components 116, 118 and/or 120 associated with the one or more dependent data nodes of the requested change to the first instance of the first data node. It may further include that the one or more change control components 116, 118 and/or 120 identify one or more dependent changes to be performed to one or more instances of the one or more of the dependent data nodes. Finally, it may include that the one or more change control components 116, 118 and/or 120 notify the change control manager 122 of the dependent changes to be performed on one or more instances of the one or more dependent data nodes.

In this example implementation of operation 470, the change control component associated with a dependent data node is notified of the requested change to a data node. For example, change control manager 122 may notify method change control component 118 of: 1) the requested change to an instance of parameter node 232 and 2) may identify that method parameter node 224 is dependent upon parameter node 232, for which the change request 'delete this parameter instance' was received. Method change control component 118 is notified of this requested change to an instance of parameter node 232 because method parameter node 224 associated with method change control component 118. Change control component 118 may then, for example, search instances of method parameter node referring to the to be deleted parameter instance in order to determine one or more dependent changes to maintain consistency between instances of nodes 232 and 224. In another embodiment, change control component 118 determines next to necessary changes also potential or advantageous changes. For example, if an instance of node 232 is changed to only allow alphanumeric characters as value, then instances of dependent method parameter node 224 may then be updated to reflect that only alphanumeric characters, or both alphabetic and numeric characters, may be used within instances of the method parameter node 224.

Within the next iteration, strategy change control component 120, being associated with strategy method parameter node 216, may be notified of 1) both the requested change to the parameter instance and the dependent changes to the instances of method parameter node 224, and 2) an indication that strategy method parameter node 216 is dependent upon method parameter node 224. Strategy change control component 120 may then determine one or more additional dependent changes to be performed to the instance(s) of the additional dependent node 216, e.g., so as to maintain consistency between instances of nodes 224, and implicitly 232, and 216 based on the requested change to the instance of node 232 and the dependent changes to the instances of the dependent data node 224.

Also, as part of operation 470, according to an example implementation, each change control component, e.g., change control components 116, 118 and/or 120, may notify the change control manager 122 of the dependent change(s) to be performed to each instance of a dependent data node. Change control manager may then record these dependent changes in block 128, e.g., as either state changes 128B or value changes 128A of one or more dependent data nodes, for example.

As a further implementation of operation 470, operation 470 may further include this process repeatedly. That is, for example, change control manager 122 may search node dependency network 124 to identify any additional dependent data nodes, e.g., based on links from dependent data nodes 224. Change control manager 122 may then notify a change control component associated with each additional dependent data node of the requested change to the first data node and the dependent changes being performed to the dependent data node(s). The change control components may identify, and notify change control manager 122, of any additional dependent changes that may be performed in response to these notified changes. And, this process may repeat, to allow change control manager and change control components to identify all dependent changes that may be performed, or may need to be performed, in response to the original request to change a first instance of a first data node, e.g., a request to change an instance of parameter node 232, for example.

At some point, all dependent nodes and dependent changes will be reported to the change control manager 122, via one or more iterations of: 1) identification of dependent nodes, 2) searches of the data node instances 126 by change control components to identify dependent node instances, 3) identification of dependent changes, and 4) reporting of the dependent changes back to the change control manager 122. According to an example implementation, once all dependent changes have been identified and reported to change control manager 122 in response to the original change request to the first instance of the first data node, these changes may then be applied, per operation 480.

According to one example implementation, a requested change to an instance of a data node may be stored in conflicts block (not shown) and is presented to a user or application via a UI 110, 112 or 114 as a conflict with existing data nodes or data node instances. The change control component(s) 116, 118 and/or 120 and/or change control manager 122 may identify one or more dependent changes to be performed to one or more dependent node instance(s) in response to the requested change, and the dependent change(s) are stored as one or more proposals to make changes to dependent data nodes in response to the requested change to the first instance of the first data node, e.g., in response to requested change to an instance of the parameter node 232, for example. Thus, the proposals may be considered as possible solutions to resolve the conflicts among data nodes, which is the requested change to the first instance of the first data node, since this requested change may require changes to one or more dependent data node instances to avoid an error or conflict among node instances, for example. In one embodiment, the change control manager delegates the presentation and/or storage of conflicts and proposals to conflicts. Such a conflict manager may select one or more of the proposed dependent changes to resolve a conflict, or conflict manager may present the one or more proposed dependent changes to a user or other application via a UI 110, 112 and/or 114 to allow the user or application to select one of the dependent changes for application or implementation.

At 480, the requested change is applied to the first instance of the first data node, and the one or more dependent changes are applied to the one or more instances of the dependent data nodes. The changes may be applied by the change control component(s) associated with each node instance to be changed. In one example implementation, during 480 the change control components may overwrite the active version of the data node instances directly. In another example implementation, the change control components may write the changes first to inactive versions of the changed data node instances, and overwrite the active with the inactive version in a separate LUW (logical unit of work). The latter implementation supports even asynchronous change management which occurs if consistency is to be maintained across multiple clients or even multiple systems. The inactive versions may be stored within change buffer 128, or other location in memory or storage.

For example, for operation 480, an active version of the data node instances is stored and employed (e.g., for searching and other processing of data node instances), and the requested change (e.g., to the first instance of the first data node) and the one or more dependent changes are stored as inactive versions of data node instances (e.g., stored in change buffer 128), wherein the applying the requested change to the first instance of the first data node and the one or more dependent changes to the one or more instances of the dependent data nodes may include overwriting the active version of the changed data node instances 126 with at least the inactive versions of the requested change to the first instance and the one or more dependent changes to the one or more instances of the dependent data nodes.

According to an example implementation, a configuration change management is used to maintain the consistency of business processes configured and run with a framework called process controller. An example business process called Routing Guide may be run according to several strategies. The standard Strategy of the Routing Guide may, for example, include the Methods:

M_Find_Route—Find possible Routes from Start to End Location

M_Sched_Route—Schedule Route Activities like Departure, Transportation . . . .

M_Route_Costs—Determine Route Costs like Mileage

M_Select_Route—Select Best Route(s), for example, the cheapest Route

The process controller allows that the standard Strategy is enhanced to a customer-specific Strategy, e.g. by adding method M_Filter_Route, which filters the routes according to EH&S regulations, for example. The business process may include performing the following configuration steps:

Parameter UI: define the Parameters

P_Max_MTr (Integer): max. Number Means of Transport involved

P_Dist_Calc (Name): Distance Calculation Approach

P_Cost_Prof (Name): Cost Profile

P_Numb_Routes (Integer): max. Number of Best Routes returned

Method UI: first, define the Methods

M_Find_Route

M_Sched_Route

M_Route_Cost

M_Filter_Route

M_Select_Route

Method UI: secondly, assign Parameters to Methods

| Method | Parameter (assigned to method on same line) |
|---|---|
| M_Find_Route | ← P_Max_MTr |
| M_Sched_Route | ← P_Dist_Calc |
| M_Route_Cost | ← P_Cost_Prof |
| M_Select_Route | ← P_Numb_Routes |

Strategy UI: first, define the Strategy S_Filter which includes the Filter (S_Filter is a name, more precisely, the unique identifier of a strategy)

Strategy UI: secondly, assign Methods to Strategy. Different methods are identified below in a particular sequence, for the strategy S_Filter.

| Strategy | Method | Method sequence No. (order of methods) |
|---|---|---|
| S_Filter | M_Find_Route | 1 |
| S_Filter | M_Sched_Route | 2 |
| S_Filter | M_Route_Cost | 3 |
| S_Filter | M_Filter_Route | 4 |
| S_Filter | M_Select_Route | 5 |

Strategy UI: finally, assign strategy specific Values to Method Parameters

| Strategy | Method | Parameter | Value assigned to parameter |
|---|---|---|---|
| S_Filter | M_Find_Route | P_Max_MTr | 2 (sets value of this parameter to 2) |
| S_Filter | M_Sched_Route | P_Dist_Calc | NAVTEQ (provider for map-based route scheduling) |
| S_Filter | M_Route_Cost | P_Cost_Prof | Cost_Summer (shipping costs calculated using profile Cost_Summer) |
| S_Filter | M_Select_Route | P_Numb_Routes | 1 (select only the best route) |

Definition of node dependency network 124 (see also FIG. 2). This includes that for each data node a structure with one or multiple data fields is defined. Each of the parameter, method, and strategy UI may be realized with a generated view cluster UI based on the structures assigned to the associated data nodes.

Definition of change control components Comp_Par (116), Comp_Meth (118) and Comp_Strat (120), and which data nodes are associated with them (125).

| Change Control Component | Associated Data Node |
|---|---|
| Comp_Par (116) | Node_Par (232) |
| Comp_Meth (118) | Node_Meth (222) |
| Comp_Meth (118) | Node_Meth_Par (224) |
| Comp_Strat (120) | Node_Strat (212) |
| Comp_Strat (120) | Node_Strat_Meth (214) |
| Comp_Strat (120) | Node_Stat_Meth_Par (216) |

Definition of links, which identify data dependencies between instances of data nodes (see also FIG. 2). These links, together with the data nodes above, result in a node dependency network 124, shown in FIG. 2, as an illustrative example.

Link 235: Node_Meth (222)->Node_Meth_Par (224)
Link 236: Node_Par (232)->Node_Meth_Par (224)
Link 233: Node_Strat (212)->Node_Strat_Meth (214)
Link 234: Node_Meth (222)->Node_Strat_Meth (214)
Link 237: Node_Strat_Meth (214)->Node_Strat_Meth_Par (216)
Link 238: Node_Meth_Par (224)->Node_Strat_Meth_Par (216)

Example operation of the configuration change management 300: deletion of Parameter P_Max_MTr in the Parameter UI Main Steps User wants to delete Parameter P_Max_MTr Parameter change control component 116 checks whether User has authority for this change and whether lock can be obtained.

Parameter change control component 116 informs change control manager 122 about the requested deletion of P_Max_MTr.

The change control manager 122 analyzes node dependency network 124, finding out that there is a link (dependency) from Node_Par (232) to Node_Meth_Par (224), and informs method change control component 118 about this state change to instance P_Max_MTr of parameter node 232.

Method change control component 118 analyzes method parameter node instances 134 and identifies that this instance must also be deleted (state change).

Method change control component 118 determines whether the user of Parameter UI 110 has Authority for dependent state change, and whether the related Lock can also be obtained Likewise, method change control component 118 informs change control manager 122 of dependent state change to instance of node 224.

Again, change control manager 122 analyzes node dependency network, finding out that there is a link 238 from method parameter node 224 to strategy method parameter node 216, and informs strategy change control component 120 about this dependency and the requested changes.

The strategy change control component 120 analyzes strategy method parameter instances 140 to identify a dependent state change to delete all strategy-specific parameter values of P_Max_MTr.

The strategy change control component 120 confirms that user has authority to make this dependent change and obtains the lock for this data.

The strategy change control component 120 similarly informs the change control manager 122 of this dependent change to this strategy method. The change control manager 122 determines that there are no additional links from strategy method parameter 216. Therefore, this may indicate, for example, that there are no further dependent changes to be performed. The changes, including the initial change and the dependent changes may be performed or applied to the data node instances 126 (e.g., including one or more of the following data node instances 130, 132, 134, 136, 138, and/or 140) upon user acceptance.

Figure 5:
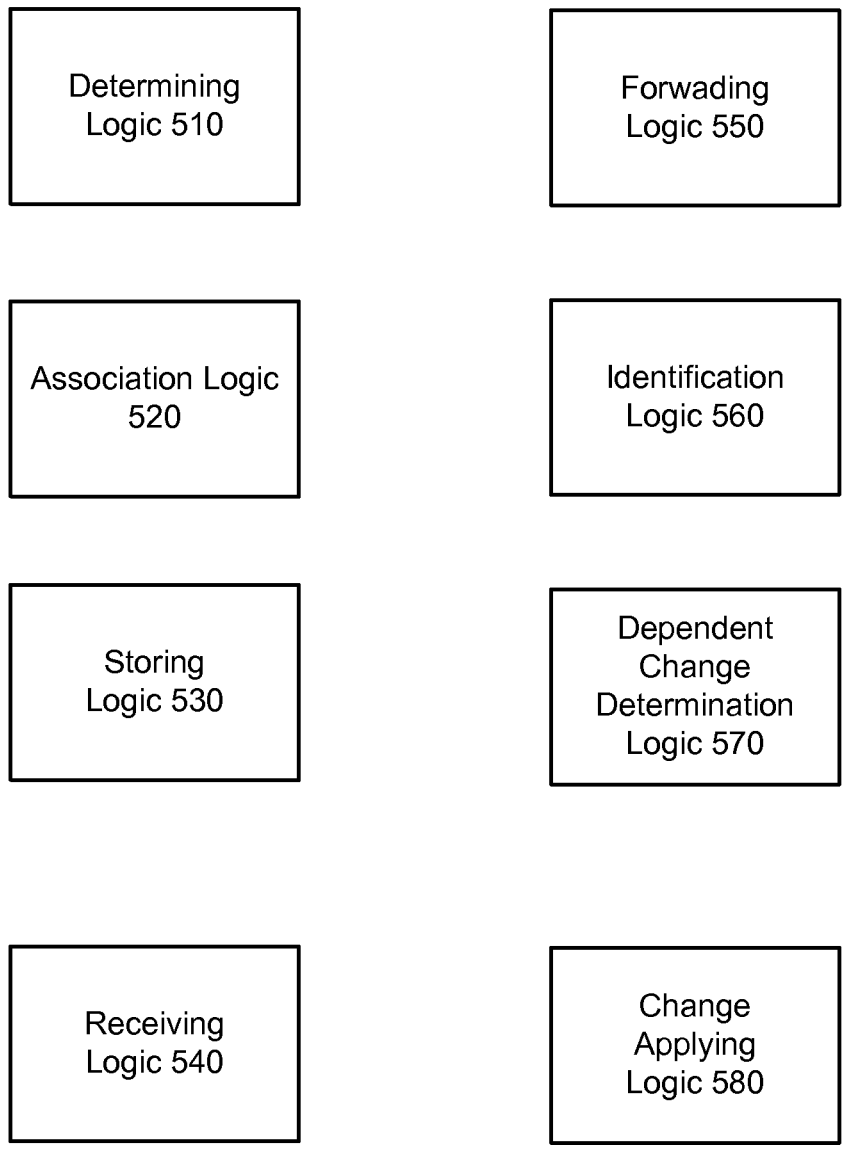
FIG. 5 is block diagram illustrating an exemplary system for performing data change management using a change control manager.

FIG. 5 is a block diagram illustrating an exemplary system for performing data change management using a change control manager. Determining logic 510 is configured to determine (which may include receiving from a user or application, detecting, calculating, or storing, etc.) a node dependency network that includes a plurality of data nodes and one or more links between two or more data nodes, each link representing a data dependency between instances of the two or more data nodes. Also, storing logic 530 may be configured to store the node dependency network.

Association logic 520 is configured to associate each data node to one of a plurality of change control components. Storing logic 530 may also be configured to store a set of data node instances, each data node instance comprising an instance of a corresponding data node of the node dependency network, each node instance having a structure identified by the corresponding data. Receiving logic 540 is configured to receive, by a first change control component, a request to change a first instance of a first data node, wherein the first data node is associated with the first change control component. Forwarding logic 550 is configured to forward the requested change from the first change control component to a change control manager. Identification logic 560 is configured to identify, by the change control manager based upon the links within the node dependency network, one or more dependent data nodes that are dependent upon the first data node. Dependent change determination logic 570 is configured to determine one or more dependent changes to be performed to one or more instances of each of the dependent data nodes to maintain consistency among instances of the data nodes. Change applying logic 580 is configured to apply the requested change to the first instance of the first data node and the one or more dependent changes to the one or more instances of the dependent data nodes.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and including executable code that, when executed, is configured to cause at least one data processing apparatus to:
   store a node dependency network that includes a plurality of data nodes and one or more links between two or more data nodes, each link representing a data dependency between instances of the two or more data nodes, a data dependency existing when a change to a data node would affect one or more dependent data nodes;
   associate each data node to one of a plurality of change control components, each of the change control components controlling changes to one or more associated data nodes;
   store a set of data node instances, each data node instance comprising an instance of a corresponding data node of the node dependency network, each data node instance having a structure identified by the corresponding data node;
   receive, by a first change control component, a request to change a first instance of a first data node, wherein the first data node is associated with the first change control component;
   forward the requested change from the first change control component to a change control manager, the change control manager coordinating changes among data node instances to maintain data consistency among data nodes;
   identify, by the change control manager based upon the links within the node dependency network, one or more dependent data nodes that are dependent upon the first data node;
   determine one or more dependent changes to be performed to one or more instances of the dependent data nodes to maintain consistency among instances of the data nodes; and
   apply the requested change to the first instance of the first data node and the one or more dependent changes to the one or more instances of the dependent data nodes.

2. The computer program product of claim 1 wherein the code being configured to cause the at least one data processing apparatus to determine one or more dependent changes comprises code being configured to cause the at least one data processing apparatus to determine, based on communication between the change control manager and a change control component associated with at least one of the one or more dependent data nodes, one or more dependent changes to be performed to one or more instances of the at least one dependent data node to maintain consistency among instances of the data nodes.

3. The computer program product of claim 1 wherein the code being configured to cause the at least one data processing apparatus to determine one or more dependent changes comprises code being configured to cause the at least one data processing apparatus to:
   notify, by the change control manager, one or more change control components associated with the one or more dependent data nodes of the requested change to the first instance of the first data node;
   identify, by each of the one or more change control components associated with the one or more dependent data nodes, one or more dependent changes to be performed to one or more instances of the one or more of the dependent data nodes; and
   notify, by each of the one or more change control components associated with the one or more dependent data nodes, the change control manager of the dependent changes to be performed on one or more instances of the one or more dependent data nodes.

4. The computer program product of claim 1 wherein the code being configured to cause the at least one data processing apparatus to determine one or more dependent changes comprises code being further configured to cause the at least one data processing apparatus to:
   identify, by the change control manager based upon links within the node dependency network, one or more additional dependent data nodes that are dependent upon one or more of the dependent data nodes;
   notify, by the change control manager, one or more change control components associated with the one or more additional dependent data nodes of the requested change to the first instance of the first data node and of the dependent changes to be performed on one or more instances of the one or more dependent data nodes;

identify, by the one or more change control components associated with the one or more additional dependent data nodes, one or more additional dependent changes to be performed to one or more instances of the one or more additional dependent data nodes; and notify, by the one or more change control components associated with the one or more additional dependent data nodes, the change control manager of the additional dependent changes to be performed on one or more instances of the one or more additional dependent data nodes.

5. The computer program product of claim 1 wherein the code being configured to cause the at least one data processing apparatus to receive, by a first change control component, a request to change a first instance of a first data node, comprises code being configured to cause the at least one data processing apparatus to receive, by a first change control component from a user or an application, a request to change a first instance of a first data node, the code further configured to cause the at least one data processing apparatus to:

present the determined dependent changes to the user or the application;

receive an acceptance or rejection of the dependent changes from the user or the application;

wherein the code being configured to cause the at least one data processing apparatus to apply the requested change to the first instance of the first data node and the one or more dependent changes to the one or more instances of the dependent data nodes comprises the code being configured to cause the at least one data processing apparatus to:

apply the requested change to the first instance of the first data node and the one or more dependent changes to the one or more instances of the dependent data nodes is performed only in response to receiving an acceptance from the user or the application; and otherwise, cancel the requested change to the first instance of the first data node and the one or more dependent changes to the one or more instances of the dependent data nodes in response to receiving a rejection from the user or the application.

6. The computer program product of claim 1 wherein the code being configured to cause the at least one data processing apparatus to receive, by a first change control component, a request to change a first instance of a first data node, comprises code being configured to cause the at least one data processing apparatus to receive, by a first change control component from a user or application, a request to change a first instance of a first data node, wherein the first change control component is configured to perform at least one of the following before forwarding the requested change to the change control manager:

confirm that the user or application has authorization to make the requested change to the first instance of the first data node; and retrieve one or more locks on the first data node for saving the changes to the first instance of the first data node.

7. A computer implemented method of data management performed by a processor, the method comprising:

storing a node dependency network that includes a plurality of data nodes and one or more links between two or more data nodes, each link representing a data dependency between instances of the two or more data nodes, a data dependency existing when a change to a data node would affect one or more dependent data nodes;

associating each data node to one of a plurality of change control components, each of the change control components controlling changes to one or more associated data nodes;

storing a set of data node instances, each data node instance comprising an instance of a corresponding data node of the node dependency network, each data node instance having a structure identified by the corresponding data node;

receiving, by a first change control component, a request to change a first instance of a first data node, wherein the first data node is associated with the first change control component;

forwarding the requested change from the first change control component to a change control manager, the change control manager coordinating changes among data node instances to maintain data consistency among data nodes;

identifying, by the change control manager based upon the links within the node dependency network, one or more dependent data nodes that are dependent upon the first data node;

determining one or more dependent changes to be performed to one or more instances of the dependent data nodes to maintain consistency among instances of the data nodes; and applying the requested change to the first instance of the first data node and the one or more dependent changes to the one or more instances of the dependent data nodes.

8. The method of claim 7 wherein the determining one or more dependent changes to be performed comprises determining, based on communication between the change control manager and a change control component associated with at least one of the one or more dependent data nodes, one or more dependent changes to be performed to one or more instances of at least one of the dependent data nodes to maintain consistency among instances of the data nodes.

9. The method of claim 7 wherein the determining one or more dependent changes to be performed comprises:

notifying, by the change control manager, one or more change control components associated with at least one of the one or more dependent data nodes of the requested change to the first instance of the first data node;

identifying, by at least one of the one or more change control components associated with the one or more dependent data nodes, one or more dependent changes to be performed to one or more instances of the one or more of the dependent data nodes; and notifying, by each of the one or more change control components associated with at least one of the one or more dependent data nodes, the change control manager of the dependent changes to be performed on one or more instances of the one or more dependent data nodes.

10. The method of claim 9, wherein the determining one or more dependent changes to be performed further comprises:

identifying, by the change control manager based upon links within the node dependency network, one or more additional dependent data nodes that are dependent upon one or more of the dependent data nodes notifying, by the change control manager, one or more change control components associated with at least one of the one or more additional dependent data nodes of the requested change to the first instance of the first data node and of the dependent changes to be performed on one or more instances of the one or more dependent data nodes;

identifying, by the one or more change control components associated with at least one of the one or more additional dependent data nodes, one or more additional dependent changes to be performed to one or more instances of the one or more additional dependent data nodes; and notifying, by the one or more change control components associated with at least one of the one or more additional dependent data nodes, the change control manager of the additional dependent changes to be performed on one or more instances of the one or more additional dependent data nodes.

11. The method of claim 7, wherein the receiving, by a first change control component, a request to change a first instance of a first data node, comprises receiving, by a first change control component from a user or an application, a request to change a first instance of a first data node, the method further comprising:

presenting the determined dependent changes to the user or the application;

receiving an acceptance or rejection of the dependent changes from the user or the application;

wherein the applying the requested change to the first instance of the first data node and the one or more dependent changes to the one or more instances of the dependent data nodes is performed only in response to receiving an acceptance from the user or the application; and otherwise, canceling the requested change to the first instance of the first data node and the one or more dependent changes to the one or more instances of the dependent data nodes in response to receiving a rejection from the user or the application.

12. The method of claim 7, wherein the receiving, by a first change control component, a request to change a first instance of a first data node, comprises receiving, by a first change control component from a user or application, a request to change a first instance of a first data node, wherein the first change control component performs at least one of the following before forwarding the requested change to the change control manager:

confirming that the user or application has authorization to make the requested change to the first instance of the first data node; and retrieving one or more locks on the first data node for saving the changes to the first instance of the first data node.

13. The method of claim 7, wherein an active version of the data node instances is stored and employed, and wherein the requested change and the one or more dependent changes are stored as an inactive version of data node instances, wherein the applying the requested change to the first instance of the first data node and the one or more dependent changes to the one or more instances of the dependent data nodes comprises overwriting the active version of the data node instances with at least the inactive version of the requested change to the first instance and the one or more dependent changes to the one or more instances of the dependent data nodes.

14. The method of claim 7, wherein the method is performed in a system with a plurality of clients and the node dependency network is determined for use by the plurality of clients, and wherein a data node represents one of client-independent customizing, client-dependent customizing, master data, or transactional data.

15. The method of claim 7, wherein a first client and a second client each are provided with the node dependency network, and where the receiving a request to change a first instance comprises client-independent changes, and wherein applying the changes further comprises scheduling a job in the second client for determining and applying all dependent changes which are specific to the second client.

16. The method of claim 7, wherein a master system includes a first data management process and a first set of data node instances, wherein a slave system includes a second data management process and a second set of data node instances, and wherein applying comprises applying the requested change and the one or more dependent changes to both the first set of data node instances and the second set of data node instances.

17. An apparatus including a processor and instructions recorded on a computer-readable medium that are executable by the processor, the apparatus comprising:

storing logic configured to store a node dependency network that includes a plurality of data nodes and one or more links between two or more data nodes, each link representing a data dependency between instances of the two or more data nodes, a data dependency existing when a change to a data node would affect one or more dependent data nodes;

association logic configured to associate each data node to one of a plurality of change control components, each of the change control components controlling changes to one or more associated data nodes;

storing logic configured to store a set of data node instances, each data node instance comprising an instance of a corresponding data node of the node dependency network, each data node instance having a structure identified by the associated data node;

receiving logic configured to receive, by a first change control component, a request to change a first instance of a first data node, wherein the first data node is associated with the first change control component;

forwarding logic configured to forward the requested change from the first change control component to a change control manager, the change control manager coordinating changes among data node instances to maintain data consistency among data nodes;

identification logic configured to identify, by the change control manager based upon the links within the node dependency network, one or more dependent data nodes that are dependent upon the first data node;

dependent change determination logic configured to determine one or more dependent changes to be performed to one or more instances of the dependent data nodes to maintain consistency among instances of the data nodes; and change applying logic configured to apply the requested change to the first instance of the first data node and the one or more dependent changes to the one or more instances of the dependent data nodes.

18. The apparatus of claim 17 wherein the dependent change determination logic comprises logic configured to determine, based on communication between the change control manager and a change control component associated with at least one of the one or more dependent data nodes, one or more dependent changes to be performed to one or more instances of at least one of the dependent data nodes to maintain consistency among instances of the data nodes.

19. The apparatus of claim 17 wherein the dependent change determination logic configured to determine one or more dependent changes to be performed comprises the dependent change determination logic configured to:

notify, by the change control manager, one or more change control components associated with at least one of the one or more dependent data nodes of the requested change to the first instance of the first data node;

identify, by at least one of the one or more change control components associated with the one or more dependent data nodes, one or more dependent changes to be performed to one or more instances of the one or more of the dependent data nodes; and notify, by each of the one or more change control components associated with at least one of the one or more dependent data nodes, the change control manager of the dependent changes to be performed on one or more instances of the one or more dependent data nodes.

* * * * *